(12) United States Patent
Habermehl et al.

(10) Patent No.: US 7,051,875 B2
(45) Date of Patent: May 30, 2006

(54) HOLDING STRAP FOR CURVED SCREWSTRIP

(75) Inventors: G. Lyle Habermehl, Gallatin, TN (US); Troy D. Hale, Hendersonville, TN (US); William S. Kepley, Portland, TN (US)

(73) Assignee: Simpson Strong-Tie Company, Inc., Dublin, CA (US)

( * ) Notice: Subject to any disclaimer, the term of this patent is extended or adjusted under 35 U.S.C. 154(b) by 274 days.

(21) Appl. No.: 10/738,121

(22) Filed: Dec. 17, 2003

(65) Prior Publication Data

US 2005/0133392 A1 Jun. 23, 2005

(51) Int. Cl.
*B65D 85/24* (2006.01)
(52) U.S. Cl. .................. 206/347; 411/442; 470/10
(58) Field of Classification Search ............. 206/338, 206/443, 343–347, 820; 411/442–444; 470/8–10
See application file for complete search history.

(56) References Cited

U.S. PATENT DOCUMENTS

| | | | |
|---|---|---|---|
| 2,982,595 A | 5/1961 | Rogers, Jr. | |
| 3,167,778 A | 2/1965 | Decot | |
| 3,592,339 A | 7/1971 | Briggs, Jr. | |
| 3,830,364 A | 8/1974 | Hedlund | |
| 3,885,669 A | 5/1975 | Potucek | |
| 3,992,852 A | 11/1976 | Schwarz | |
| 4,019,631 A | 4/1977 | Lejdegard | |
| 4,146,071 A | 3/1979 | Mueller | |
| 4,167,229 A | 9/1979 | Keusch | |
| 4,930,630 A | 6/1990 | Habermehl | |
| 5,409,111 A | 4/1995 | Takumi | |
| 5,443,345 A | 8/1995 | Gupta | |
| 5,542,323 A | 8/1996 | Habermehl | |
| 5,544,746 A | 8/1996 | Dohi | |
| 5,568,753 A | 10/1996 | Habermehl | |
| 5,609,712 A | 3/1997 | Takumi | |
| 5,622,024 A | 4/1997 | Habermehl | |
| 5,758,768 A | 6/1998 | Habermehl | |
| 5,779,420 A * | 7/1998 | Huang | ........................ 206/347 |
| 5,870,933 A | 2/1999 | Habermehl | |
| 5,927,163 A | 7/1999 | Habermehl | |
| 5,934,162 A | 8/1999 | Habermehl | |
| 6,074,149 A | 6/2000 | Habermehl | |
| 6,494,322 B1 | 12/2002 | Habermehl | |

FOREIGN PATENT DOCUMENTS

| | | |
|---|---|---|
| CA | 1040600 | 10/1978 |
| CA | 1054982 | 5/1979 |
| DE | 2363974 | 8/1984 |
| WO | WO-03/027517 | 4/2003 |

* cited by examiner

*Primary Examiner*—Luan K. Bui
(74) *Attorney, Agent, or Firm*—Vierra Magen Marcus & DeNiro LLP

(57) ABSTRACT

A curved screwstrip comprising in combination a plastic holding strap and a plurality of threaded fasteners. The plastic holding strap has a greater mass in its top half than in its bottom half so that shrinking after extrusion will tend to have the holding strap adopt a preferred curved configuration.

29 Claims, 10 Drawing Sheets

HOLDING STRAP FOR CURVED SCREWSTRIP

SCOPE OF THE INVENTION

This invention relates to curved collated screwstrips of relatively short discrete length comprising a holding strap, preferably of plastic, retaining a plurality of screws in an arcuate row and, more particularly, to a configuration for the holding strap of such curved screwstrips.

BACKGROUND OF THE INVENTION

Screwstrips are known wherein the screws are connected together by a retaining strap, preferably of plastic material, and adapted to be fed into an autofeed screw fastening tool and successively driven from the belt as the screwstrip is advanced through the tool. Known screwstrips of this type include those referred to and disclosed in U.S. Pat. No. 4,167,229 to Keusch et al, issued Sep. 11, 1979 and Canadian Patent 1,054,982 to Schwarz, issued May 22, 1979 and the present applicant's U.S. Pat. No. 5,758,768, issued Jun. 2, 1998, U.S. Pat. No. 5,927,163, issued Jul. 27, 1999, and U.S. Pat. No. 6,494,322, issued Dec. 17, 2002, the disclosures of which are incorporated herein by reference. Such screwstrips are adapted to be driven in autofeed screwdrivers, such as taught by the applicant's U.S. Pat. No. 5,568,753, issued Oct. 29, 1996, U.S. Pat. No. 5,934,162, issued Aug. 10, 1999 and U.S. Pat. No. 5,870,933, issued Feb. 16, 1999, the disclosures of which are incorporated herein by reference.

The present inventor has pioneered the use of such screwstrips of shorter discrete length, for example, 12 inches (30 cm), as taught by the aforementioned U.S. Pat. No. 5,758,768 and U.S. Pat. No. 6,494,322, and particularly the use of "curved" such screw strips as particularly described with reference to the embodiment illustrated in FIG. 15 of U.S. Pat. No. 6,494,322.

Previously known methods for manufacturing screwstrips are disclosed in above-noted U.S. Pat. No. 4,167,229, U.S. Pat. No. 3,992,852 to Schwarz et al, issued Nov. 23, 1976 and U.S. Pat. No. 5,609,712 to Takumi, issued Mar. 11, 1997.

These patents generally teach holding screws in a straight line as on a moving chain or between two moving chains and extruding plastic material to form the holding strap from one or more stationary extrusion dies on to the moving screws typically with the screws and extrudate to be passed between forming rollers. These patents do not provide for manufacture of curved screwstrips.

SUMMARY OF THE INVENTION

The present invention provides a preferred configuration for the holding strap of "curved" screwstrips of discrete length with a greater proportion of the holding strap in one of the top and bottom halves of the holding strap.

An object of the present invention is to provide an improved curved screwstrip.

Another object is to provide a method for manufacture of a curved screwstrip.

The applicant of this invention has appreciated a difficulty which arises in respect of screwstrips comprising a holding strap formed from extruded plastic material. Plastic material, after being extruded and even after being substantially permanently set, shrinks with final setting of the plastic material. The extent to which the plastic material will shrink will have an effect on the final size and shape of the resultant product. The extent to which the extruded plastic holding strap will have its shape altered due to shrinking has been appreciated by the present applicant as being affected by the thickness of the holding strap at various relative positions on the holding strap. The present inventor has appreciated that in an elongate holding strap, by providing a greater mass of the plastic material in a top half of the beam as contrasted with the bottom half, then the greater mass in the top portion will tend to shrink to a greater extent than the lesser mass in the bottom portion and this will have a tendency for the holding strap and, therefore, the screws carried by the holding strap to adopt and/or maintain a curved condition such that the heads of the screws are closer together than the tips. In contrast, insofar as a greater proportion of the mass of the holding strap is in a bottom portion of the holding strap, then shrinking of the larger mass portion in bottom half of will have a tendency to relatively have the holding strap and, therefore, the screwstrip adopt a curvature which is with the tips of the screws closer together than the heads. For a screw tip which desired to be straight, it is preferred to have the larger mass of the holding strap centrally of the height of the holding strap. Therefore, the present inventor has appreciated that insofar as it is desired to have screwstrips which are formed to adopt and/or which are to maintain a desired curved configuration, then it is advantageous to provide the holding strap with a greater proportion of the mass of plastic forming the extruded holding strap provided in one of a top half or bottom half of the holding strap depending on which curvature is desired. Further, with an increased proportion of the mass of the holding strap in the desired half of the holding strap, the holding strap will on shrinking have an inherent tendency to assume a desired curved configuration and the curvature adopted on shrinking can be utilized as a method for manufacture of a curved screwstrip by extruding a straight holding strap and letting it shrink to adopt a curved shape. In such manufacture, the screwstrip is preferably cut into discrete lengths before it has substantially cooled and in such discrete lengths is cooled without constraining the lengths from assuming the desired curved shape such that the differential shrinking of different portions of the beam results in the beam assuming a curved condition.

Accordingly, in one aspect, the present intention provides a curved screwstrip comprising in combination a plastic holding strap and a plurality of threaded fasteners;

each fastener disposed about an axis and having a head at an upper end, a tip extending from the other lower end and a shank extending from below the head to the tip about the axis, threads about the shank, the holding strip holding the fasteners in a row in spaced side-by-side relation with the axis of the fasteners in a common plane;

at least a portion of the holding strip holding the fasteners in a generally curved configuration wherein the heads of the screws lie on a first curve in the common plane and the tips of the screws lie on a second curve in the common plane, wherein at each fastener in the portion a radius of curvature of the first curve is less than a radius of curvature of the second curve, the holding strip comprises an elongate beam member which extends axially relative the fasteners and longitudinally between fasteners, the beam having a height measured parallel the axis of the fasteners between an uppermost surface of the beam and a lowermost surface of the beam, a middle of the beam defined as halfway between the uppermost surface and the lowermost surface with a top portion above the middle and a bottom portion below the middle, the beam formed of plastic material of substantially constant density, the top portion of the beam having a top mass, the bottom portion of the beam having a bottom mass, the top mass being greater than the bottom mass.

In another aspect, the present invention provides a method of manufacture of a curved screwstrip, the curved screwstrip comprising in combination, a holding strip and a plurality of fasteners, each fastener disposed about an axis and having a head and an upper end, a tip extending from the other end and a shank extending from below the head to the tip about the axis, the holding strip holding the fasteners in a row spaced side-by-side relation with the axis of the fasteners in a common plane, the holding strip comprises an elongate beam member which extends axially relative the fasteners and longitudinally between fasteners, at least a portion of the holding strip holding the fasteners in a generally curved configuration wherein the heads of the fasteners lie on a first curve in the common plane and the tips of the fasteners lie in a corresponding second curve in the common plane of greater radii:

the method comprising:

maintaining a plurality of screws in a generally straight row in spaced side-by-side relation with the axes of the fasteners generally parallel and in a common plane, extruding plastic to form the holding strap from an extrusion die onto the shanks of the screws in the straight row, wherein the plastic as extruded is in an extrudable, molten state at an elevated first temperature, forming the holding strip as a straight elongate beam member which extends axially relative the fasteners and longitudinally between fasteners to provide a straight screwstrip in which:
i) the beam having a height measured parallel the axis of the fasteners between an upper most surface of the beam and a lowermost surface of the beam,
ii) a middle of the beam defined as halfway between the uppermost surface and the lowermost surface with a top portion above the middle and a bottom portion below the middle,
iii) the top portion of the beam having a top mass,
iv) the bottom portion of the beam having a bottom mass, and
v) the top mass being greater than the bottom mass, and cooling the straight screwstrip whereby with cooling the differential in shrinking of top portion of the beam compared to the bottom portion of the beam results in the holding strap assuming a curved condition.

BRIEF DESCRIPTION OF THE DRAWINGS

Further aspects and advantages of the present invention will appear from the following description taken together with the accompanying drawings, in which.

DETAILED DESCRIPTION OF THE DRAWINGS

Figure 1:
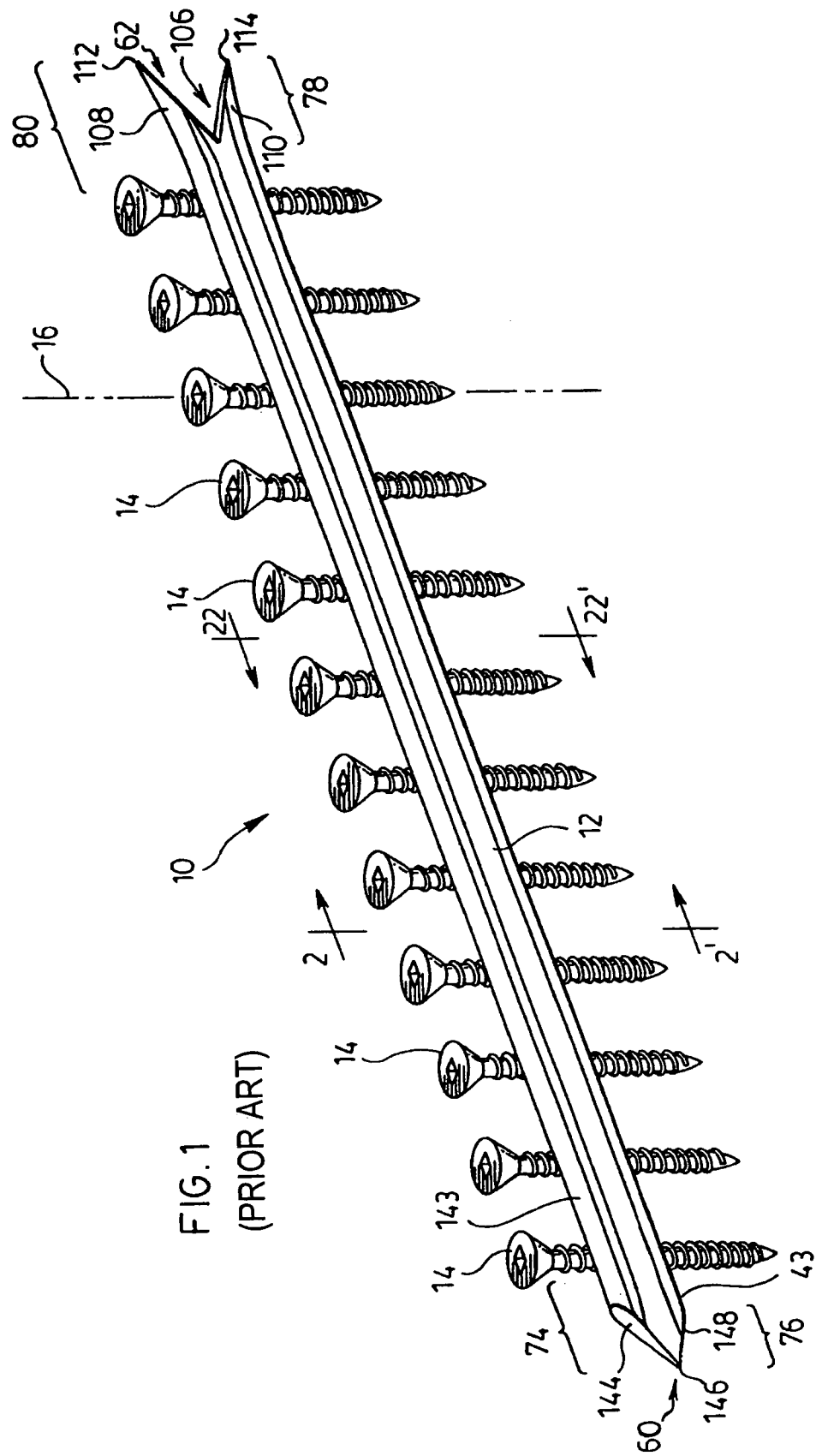
FIG. 1 is a pictorial view of a prior art straight screwstrip.
Figure 2:
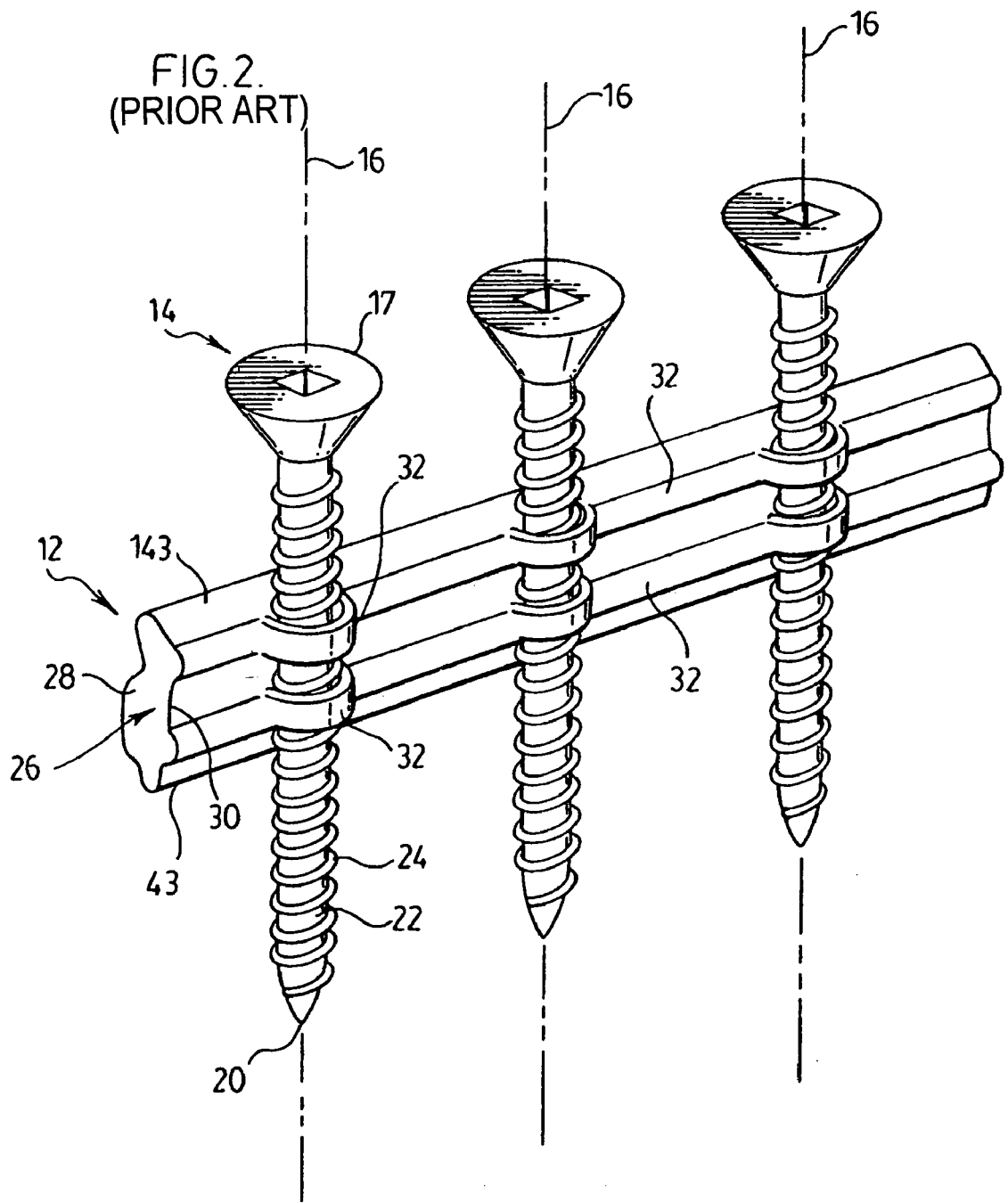
FIG. 2 is a pictorial view of a short length of the prior art screwstrip of FIG. 1 between section line 2–2' and 22–22' and showing the other side of the screwstrip not shown in FIG. 1.
Figure 3:
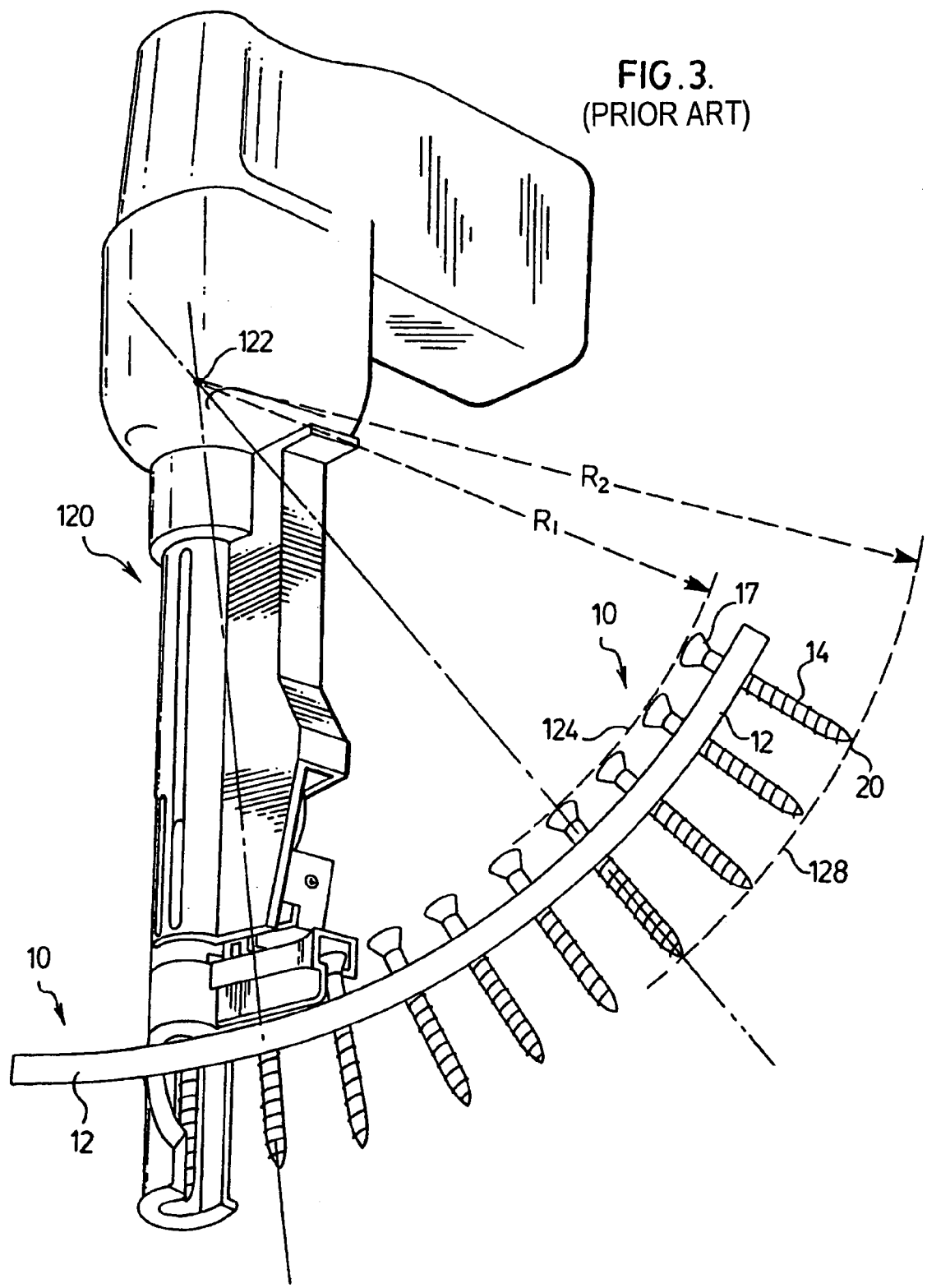
FIG. 3 is a pictorial view of the prior art screwdriver assembly driving a screwstrip in accordance with the present invention of a fixed length having a curved configuration.

Reference is made to FIGS. 1 to 3 which show a prior art collated screwstrip as disclosed in U.S. Pat. No. 6,494,322 generally indicated 10 and comprising a holding strap 12 carrying a plurality of screws 14. The holding strap 12 comprises an elongate thin band of plastic, preferably thermoplastic material. The screwstrip 10 of FIG. 1 comprises a complete screwstrip of discrete length carrying twelve screws.

Each screw 14 is disposed about an axial central axis 16 and has a head 17 at an upper end, a tip 20 extending from the other lower end and a shank 22 extending from the head to the tip about the axis 16. The shank 22 carries threads 24.

The screws 14 are carried on the holding strap 12 evenly spaced from one another. In the embodiment shown in FIGS. 1 and 2, while not necessary, the axis 16 of each screw is parallel the axis of each other screw. The axes 16 of all the screw lies in a common plane, which is planar and extends centrally through each screw.

The holding strap 12 comprises an elongate beans member 26 which is generally disposed on one side of the common plane, which side is referred to herein as the beam or outboard side. The other side is referred to herein as the strap or inboard side. The outboard side is designated by numeral 28 in FIG. 2 and the inboard side is designated by numeral 30.

For each screw 14, two fragile strap members 32 are provided to secure the screw to the beam member 26. The straps 12 bridge the beam member 26 across the shank 22 so as to extend from the beam member 26 to pass around the shank 22 on the inboard side 30 of the shank.

Each strap 32 is sized so as to extend radially from the shank 22 beyond the radial extent of the threads such that where a strap 32 traverses a thread 24, the strap 32 is not severed.

The threads 24 on the outboard side of each screw 14 preferably are engaged in grooves in an inboard surface of the beam member 26.

The beam 26 has an uppermost surface 143 and a lowermost surface 43. The beam has a height measured as the distance between the upper surface 143 and lower surface 43 parallel the axes of the screw. The beam has a width measured from outboard surface 28 to inboard surface 30 normal to the central plane in which the axes of the screws lie.

Reference is made to FIG. 3 which shows a power screwdriver assembly 120 in accordance in with U.S. Pat. No. 5,927,163 adapted to drive a screwstrip 10 which screwstrip is of the type shown in FIGS. 1 and 2, however, is curved in the sense the heads 17 of the screws 14 lie in a curved plane generally indicated by curved dashed line 124 at a first constant radius $R_1$ from a point 122. Similarly, the tips 20 of the screws 14 lie in a curved plane generally indicated by curved dashed line 128 at a second constant radius $R_2$ from point 122. Radius $R_2$ is greater than radius $R_1$, Preferably, all of the axes of the screws lie in the same plane. Each screw 14 preferably extends radially from point 122. One advantage of the curved discrete screwstrip 10 is that the tips of screws 14 which are yet to be driven are spaced further rearward from a workpiece than tips which are all in the same straight line. Having the tips of the screws 14 spaced from the workpiece can be of assistance in preventing the tips of the workpiece not yet driven from marking the surface of a workplace.

A preferred radius of curvature may be in the range of 12 to 36 inches, more preferably, 18 to 24 inches, although this is not limiting. Preferably, the radius of curvature is in the range of about 18 to 24 inches for screwstrips of about 6 to 24 inches in length.

Figure 4:
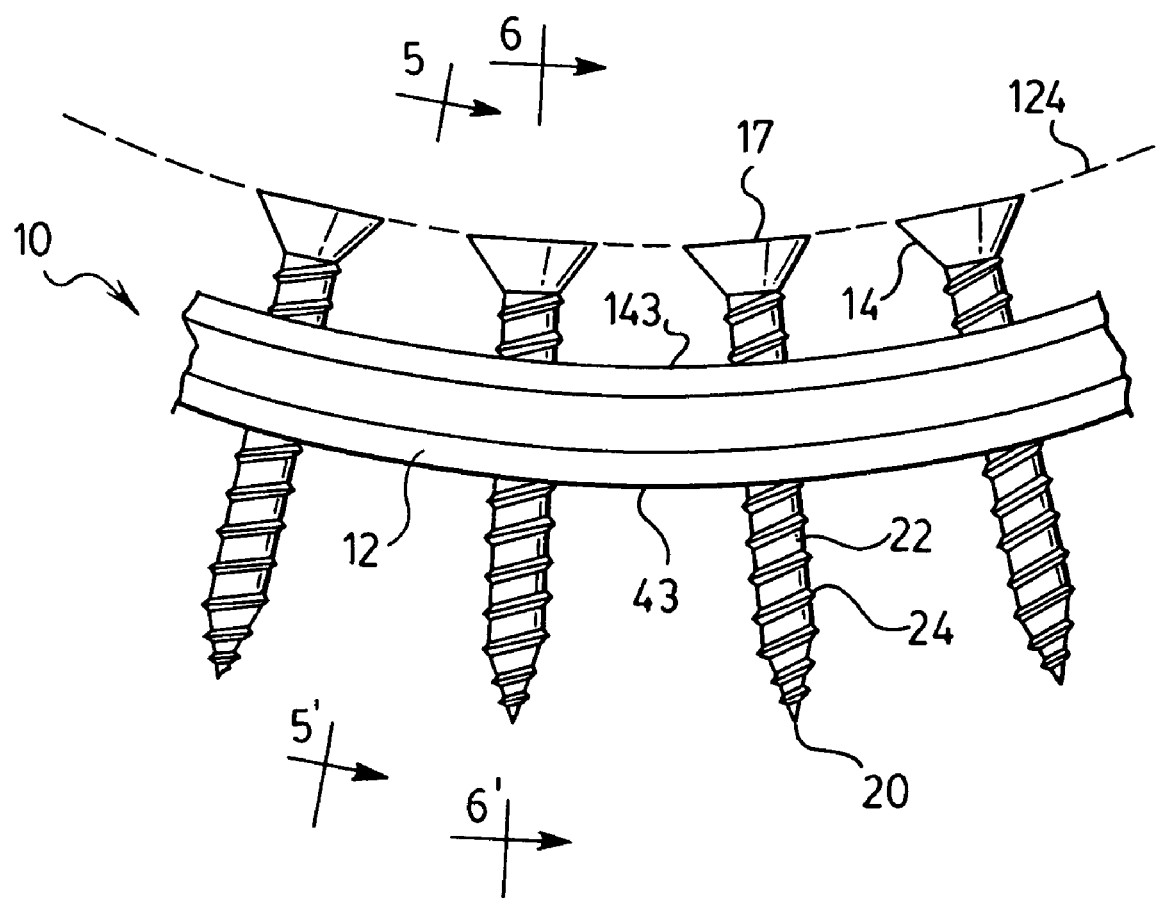
FIG. 4 is an enlarged side view of a segment of the curved screwstrip in accordance with the present invention similar to that in FIG. 3.
Figure 5:
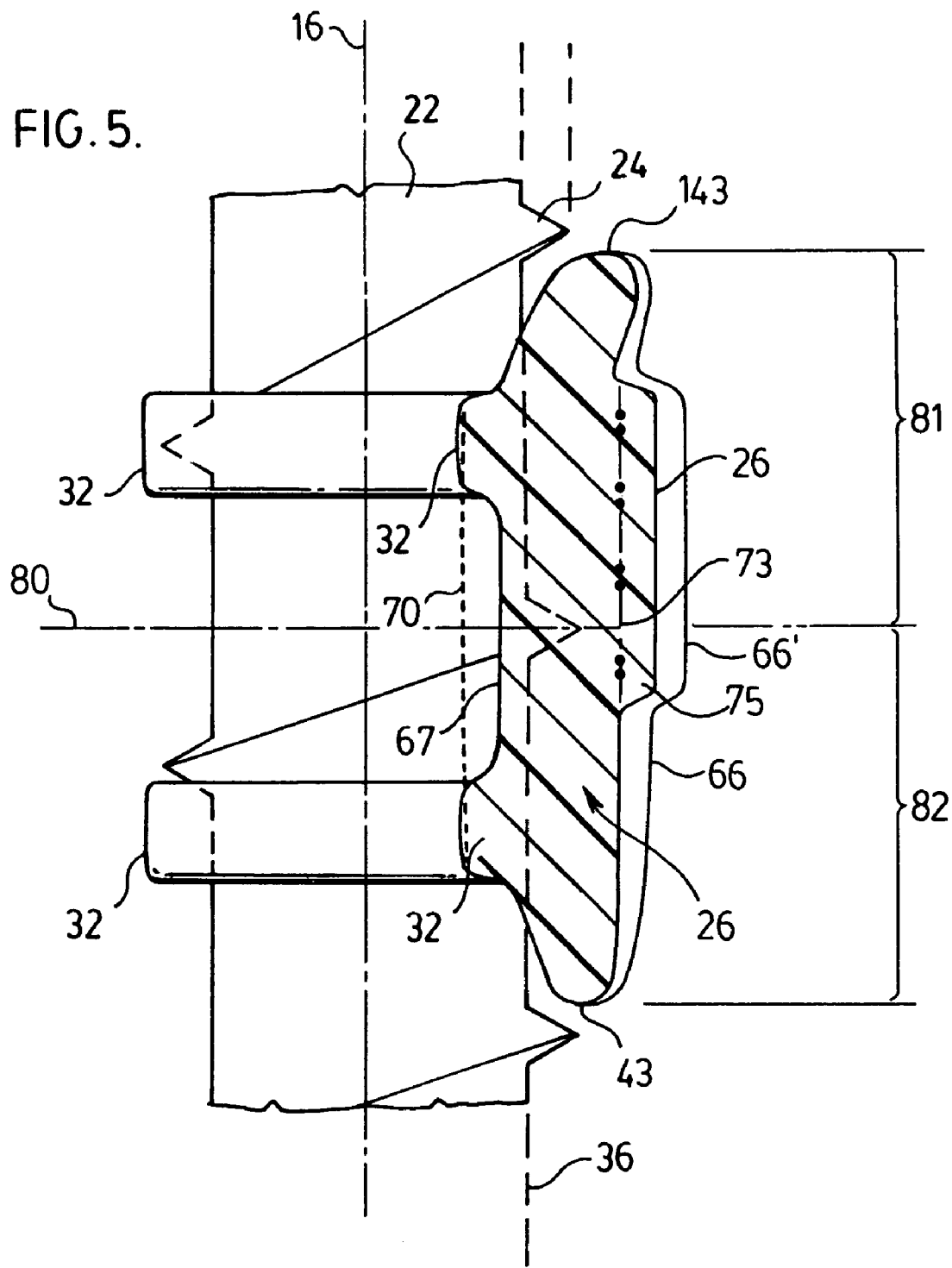
FIG. 5 is a cross-sectional end view through the screwstrip of FIG. 4 along section line 5–5'.

Reference is made to FIGS. 4 and 5 which show a curved screwstrip in accordance with the first preferred embodiment of the present invention. The holding strap 12 has a height measured parallel the axis of the screw between the uppermost surface 143 of the beam and the lowermost surface 42 of the beam.

Figure 6:
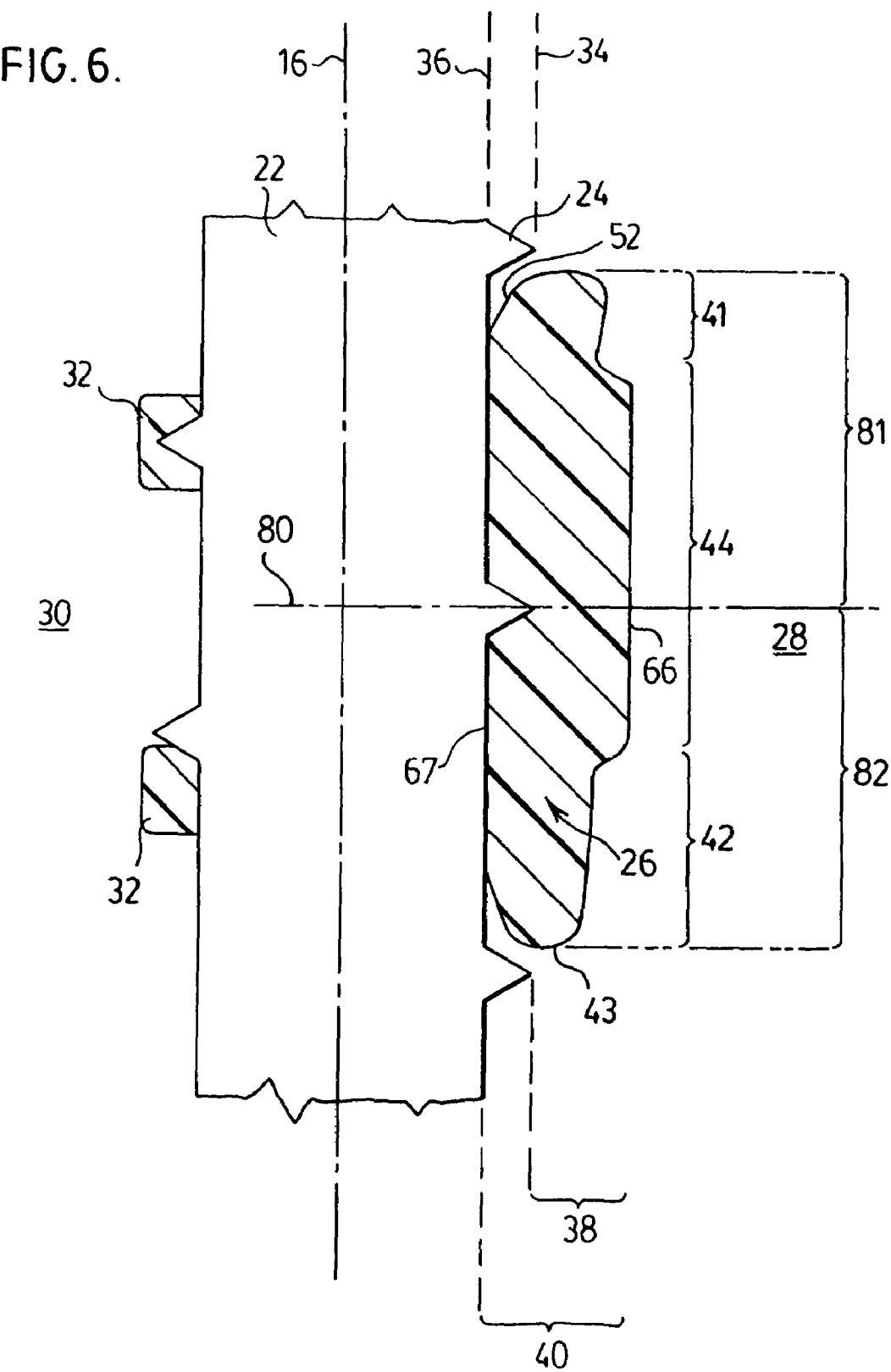
FIG. 6 is a is a cross-sectional end view through the screwstrip of FIG. 4 along section line 6–6'.

Dashed and dotted line 80 represents a plane defining in terms of height, a middle of the beam 26, that is, a plane or line as seen in the FIGS. 5 and 6 halfway between the uppermost surface 143 and the lowermost surface 42, and normal the axis 16 of the screws 14. The middle plane 80 defines a top portion 81 of the beam above the middle plane 80 and a bottom portion 82 of the beam below the middle plane 80. As can be seen in each of FIGS. 5 and 6, the cross-sectional area of the top portion 81 of the beam is greater than the cross-sectional area of the bottom portion 82 of the beam. The top portion 81 of the beam 26 representing all the material of the beam above the middle plane 80 has a mass referred to as a top mass. The bottom portion 82 of the beam 26 representing all the material of the beam below the middle plane 80 has a mass referred to as a bottom mass. With the beam being formed of plastic materials of substantially constant density, the top mass being the mass of the top portion 81 of the beam, is greater than the bottom mass being the mass of the bottom portion 82 of the beam.

As best seen in FIG. 6, the beam member 26 is shown to have three portions, namely, an uppermost portion 41 closest to the head of the screw, a lowermost portion 42 closest the tip of the screw and an enlarged reinforcing central portion 44 between the uppermost portion and the lowermost portion. The central portion 44 is of a greater width than the uppermost portion 41 or the lowermost portion 42. Thus, as seen, the central portion 44 extends farther from the axis 16 than either the uppermost portion 41 or the lowermost portion 42. The central portion 44 extends outboard from the axis 16 substantially a constant distance over its height to present an outboard surface 66 over the central portion 44 in an outboard plane parallel the common plane in which the axis 16 lies.

The uppermost portion 41 is of a width similar to that of the lowermost portion 42, however, the lowermost portion 42 is shown to be of larger height. Given that the central portion 44 is of greatest width and that the central portion 44 has a greater extent above the middle plane 80, it can easily be seen that in FIG. 6, the top mass is greater than the bottom mass.

Having the top mass greater than the bottom mass has been appreciated by the present inventor as providing a configuration in which the beam, after having been formed by extrusion, will have a tendency to shrink to a greater extent over the top portion 81 than over the bottom portion. This provides a tendency for the beam 26 to adopt a configuration in which its upper surface 143, as seen in FIG. 4, has a lesser length than its lowest surface 43, thus providing a tendency for the beam and, therefore, the screwstrip, to adopt a curved configuration as illustrated in FIG. 4 with the heads of the screw and the uppermost surface 143 being of a lesser radius as compared to the lowermost surface 43 and the tips of the screws. At the least, having a configuration with the top portion of the beam having a top mass which is greater than the bottom mass of the bottom portion of the beam will, in any screwstrip which may have already been pre-formed to adopt a curved configuration as shown in FIG. 4, assist in maintaining this curved configuration and avoid a possible tendency to be inherently biased to adopt a straighter configuration or configuration curved with the tips at a lesser radius than the heads.

Figure 8:
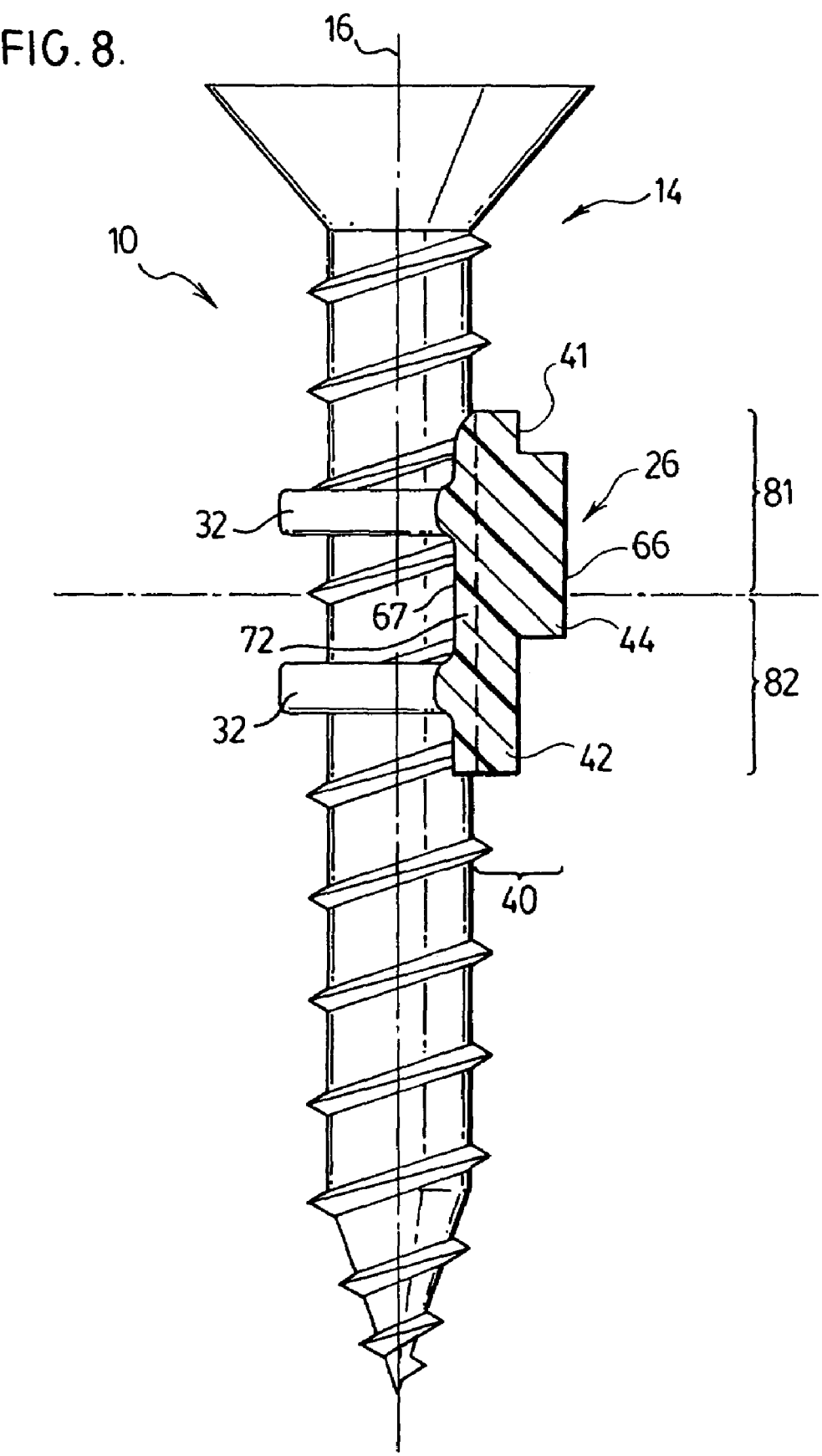
FIGS. 8, 9, and 10 are, respectively, each a cross-sectional end view of a screwstrips in accordance with second, third and fourth embodiments of the present invention.
Figure 9:
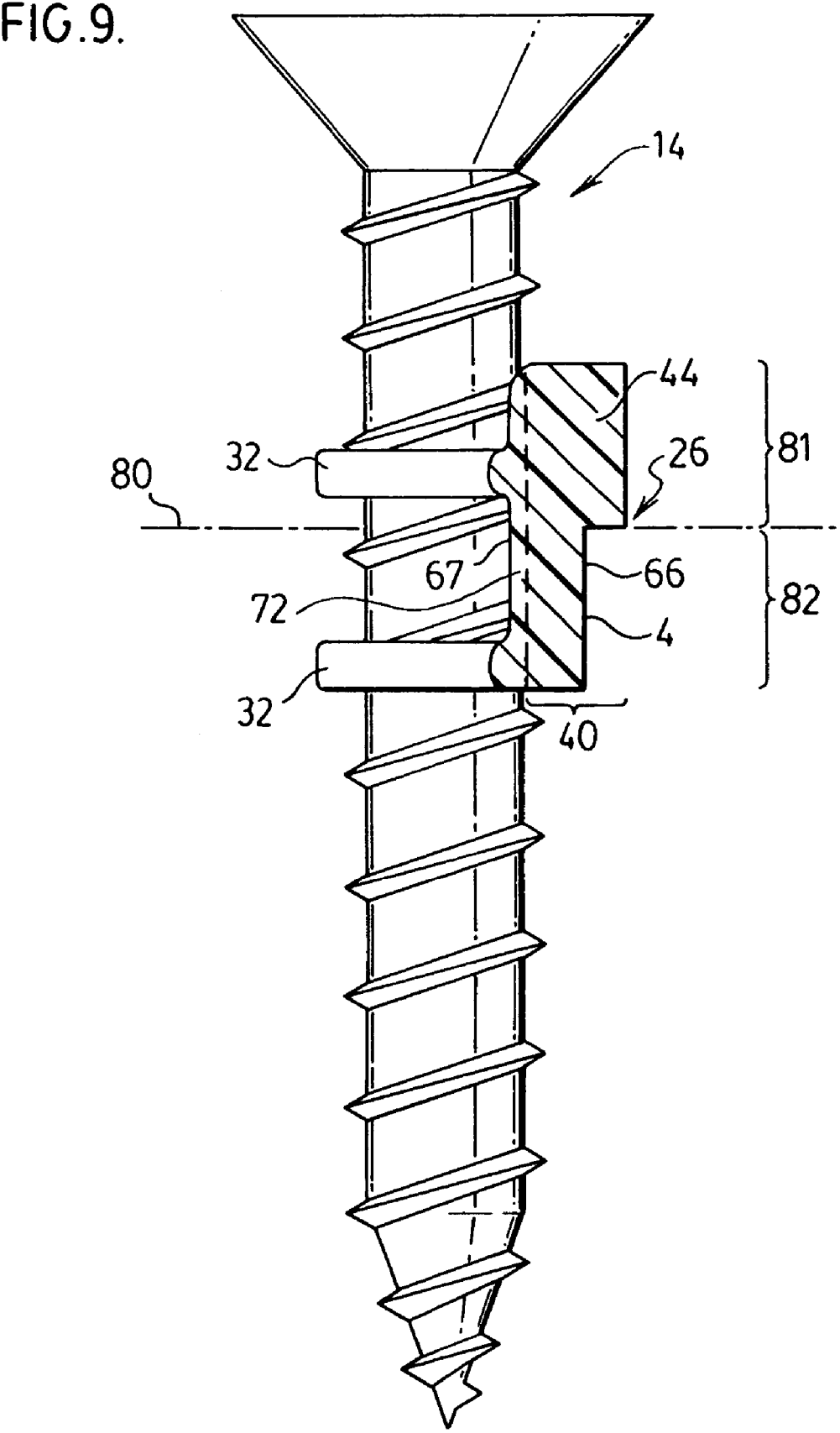
Figure 10:
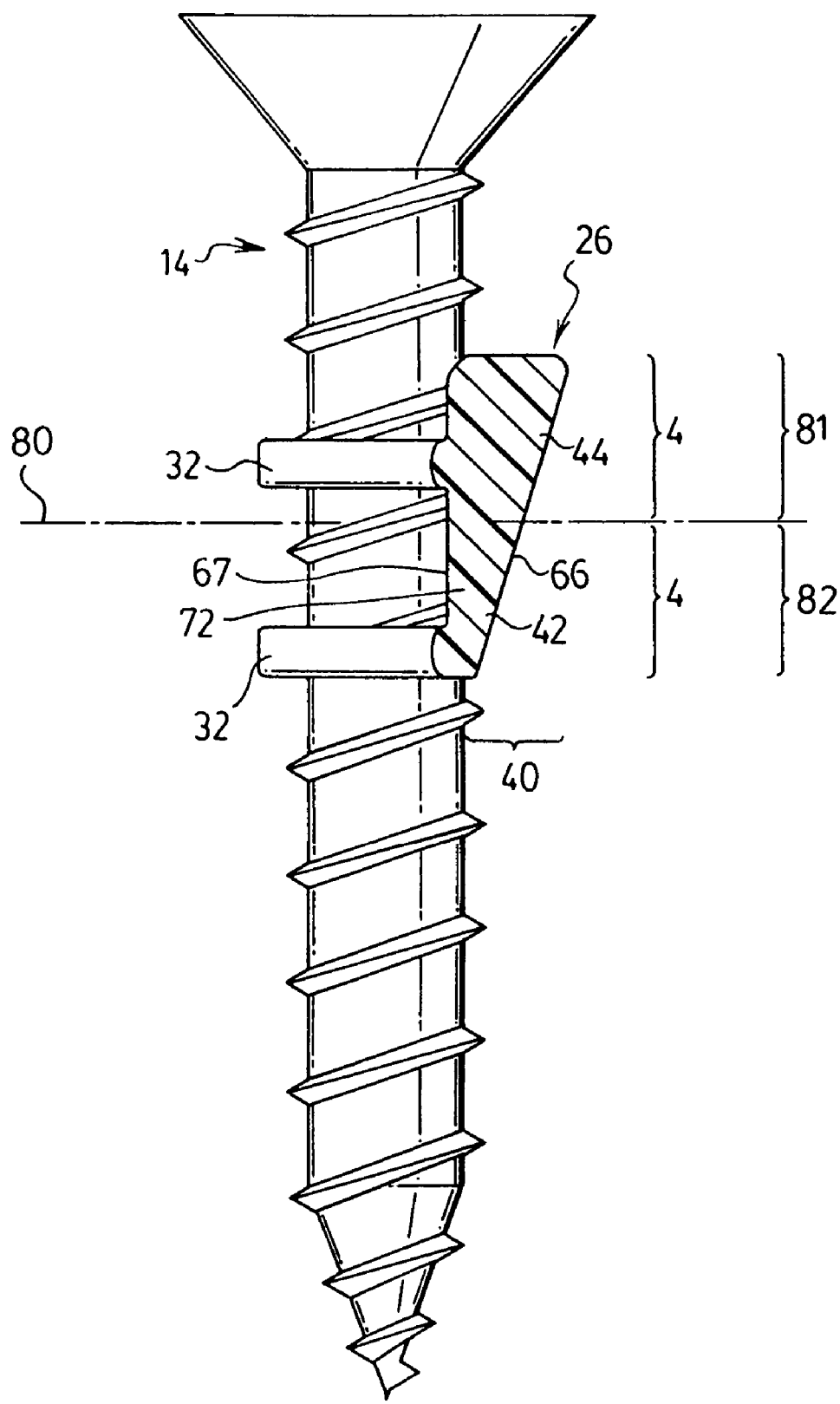

Reference is made to FIGS. 8, 9 and 10 which each show a separate embodiment of a screwstrip 10 as illustrated in cross-sectional end view between two screws 14 in the holding strap.

In FIG. 8, the beam member 26 has a generally T-shape with the uppermost portion 41 and lowermost portion 42 being rectangular of similar width, but different height with the uppermost portion 41 having a lesser height. The enlarged reinforcing central portion 44 is also of generally rectangular shape. Clearly, it is seen in FIG. 8 that the beam has a cross-sectional profile normal to the common plane through axis 16 defining a profile area in which a larger proportion of the profile area is in the top portion 81 above the middle plane 80 than in the bottom portion 82 below the middle plane 81. It follows that the mass of the top portion 81 of the beam is greater than the mass of the bottom portion 82 of the beam.

FIG. 9 shows the beam member 26 as of a generally L-shape with an uppermost portion 41 and an enlarged reinforcing portion 44 both being generally rectangular but with the reinforcing portion 44 having a greater width.

As seen in FIG. 9, a larger portion of the profile area of the beam is in the top portion 81 of the beam than in the bottom portion 82 and, therefore, it follows that as is preferred with the beam having a substantially identical cross-sectional shape throughout its length, that the top mass of the top portion 81 is greater than the bottom mass of the bottom portion 82.

FIG. 10 shows the beam member 26 as of a generally triangular shape in cross-section with an lowermost portion 42 of reduced width compared to a reinforcing portion 44 of increasing width closer to the head.

As is apparent from FIG. 10, the cross-sectional profile area of the top portion 81 of the beam 26 is greater than the profile area in the bottom portion 82. It follows, therefore, that the mass of the top portion 81 is greater than the mass of the bottom portion 82.

The embodiment of FIGS. 8 to 10 are but further examples of beam members 26 with the mass of the beam distributed such that a greater proportion of the mass is in a top half of the beam.

In accordance with the preferred embodiments of the present invention, it is preferred that the top mass of the top portion comprise 55% or greater of the total mass of the beam. More preferably, the top mass of the top portion 81 comprises between about 60% and 80% of the total mass of the beam and complementarily, the bottom mass of the bottom portion 82 of the beam comprises between 40% and 20% of the total mass such that the sum of the top mass and the bottom mass representing 100% of the total mass of the beam.

As will be described in greater detail, the beam in accordance with the preferred embodiments preferably comprises a beam having a cross-sectional profile which is substantially constant at least between adjacent screws but also, preferably, to some extent, throughout the entire height of the beam.

Referring to FIGS. 5 and 6, the beam member 26 has an outboardmost surface 66 which extends the full height of the beam member. This outboardmost surface 66 defines a profile as seen in cross-sectional view normal the common plane which is substantially the same in any cross-section normal the common plane at any point along the entire length of the beam member 26. Thus as seen in the cross-section of FIG. 5 which is intermediate two screws and in the cross-section of FIG. 6 which is through a screw, the profile of outboardmost surface 66 is substantially identical.

In FIG. 6, a first dashed line is shown as 34 which represents a plane 34 parallel the common plane including axis 16 representing the farthest extension of the threads 24 away from the common plane. A second dashed line is shown as 36 which represents in a plane parallel the common plane which represents the farthest extension of the shank 22 away from the common plane.

Figure 7:
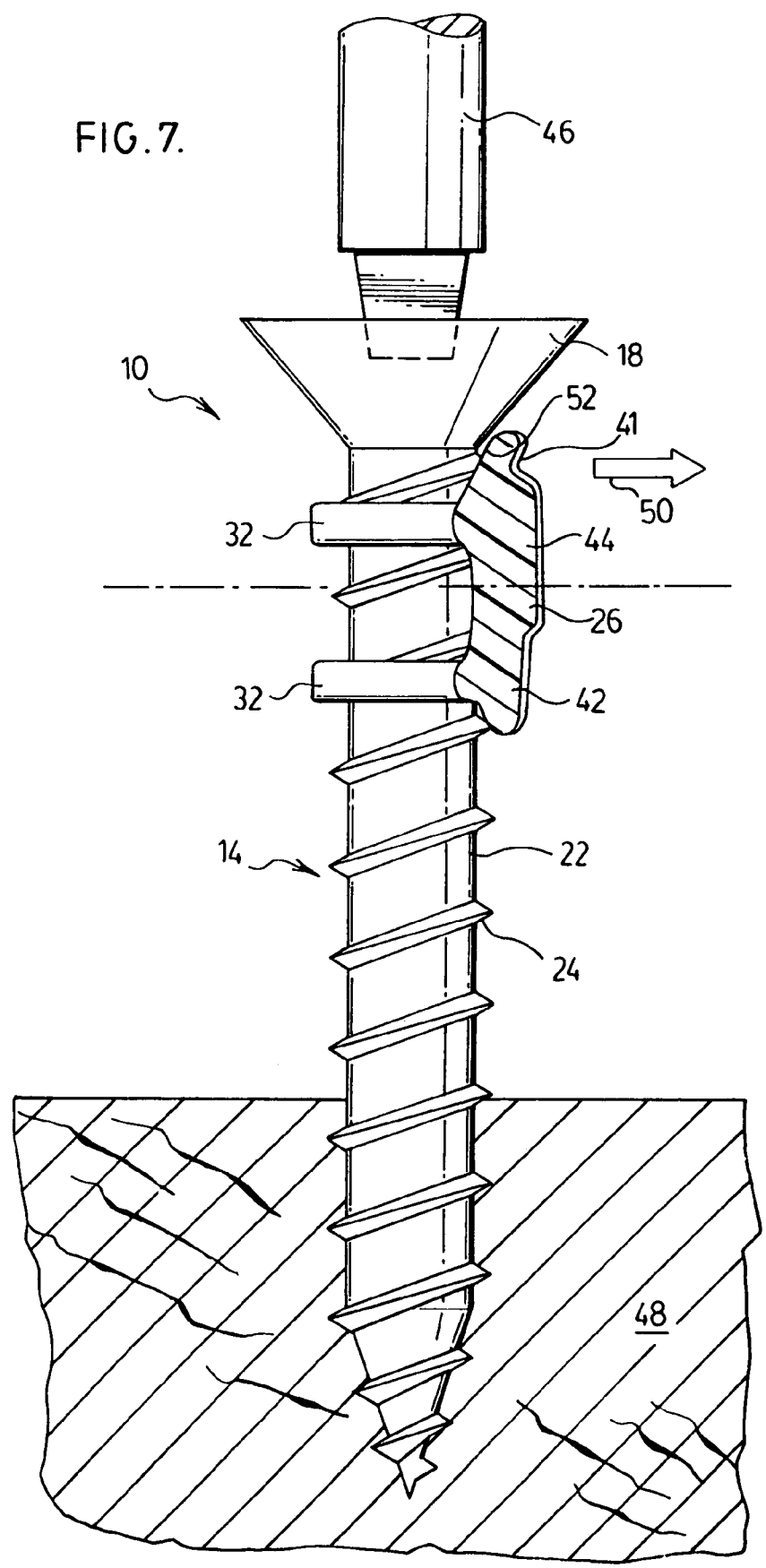
FIG. 7 is a cross-sectional end view through the screwstrip of FIG. 4 along section line 5–5' similar to that of FIG. 5 but showing the entirety of a screw in the course of being driven by a screwdriver into a workpiece.

Use of a screwstrip of this invention is schematically illustrated with reference to FIG. 7 having regard to the known manner in which known screwstrips are driven by known power drivers such as that taught by U.S. Pat. No. 4,164,071 to Mueller et al.

In use, a screw 14 in the holding strap 12 is fed into a position in axial alignment with a reciprocating and rotating screwdriver bit 46 with the beam 26 of the holding strap held against movement towards a workpiece 48, the screwdriver bit 46 engages the head 17 of the screw 14 and rotates the screw driving it forwardly into the workpiece. By reason of the threads 24 on the shank 22 being threadably engaged with the holding strap, the screw on rotation is driven downwardly relative the holding strap with the holding strap, in effect, serving to guide the screw into initial engagement with the workpiece. Further rotation of screw 14 engaged in both the workpiece and the holding strap draws the screw down into the workpiece until the head 14 of the screw engages the beam member 26 of the holding strap. With further rotation of the screw with the beam member 26 held against movement towards the workpiece, the head 17 of the screw passes through the holding strip rupturing the fragile straps 32 yet leaving the beam member 26 as a continuous length. Thereafter, the screw is driven fully into the workpiece. FIG. 7 illustrates the screwstrip in use at a time when the head 18 of the screw has been engaged with the beam member 26 and the head is commencing to exert downward pressure on the beam member. Since the screw is captured between the workpiece and the screwdriver bit 46, for the screw to move past the holding strip, the straps 32 must be broken and the beam member 26 must deflect away from the screw head in a direction normal the central plane as indicated by arrow 50.

The holding strap in accordance with this invention has been configured to increase the likelihood that on the head 17 of the screw engaging the holding strap, the holding strap will be deflected radially way from the screw without the undersurface of the head 17 catching on the holding strap. As seen, the beam member 26 includes on the inboard side of the uppermost portion 41 a camming surface 52 which is disposed at an angle to the axis of the screw. The camming surface 52 angles upwardly and away from the shank 22 of the screw. Engagement between the camming surface 52 and the undersurface of the head 17 urges the holding strap away from the screw and assists in rupturing the straps 32. As well, initial engagement of the camming surface 52 will tend to pivot the beam member clockwise about the upper strap 32 as seen in FIG. 7 thus twisting the beam member about a longitudinal axis. The camming surface 52 preferably forms an acute angle with the axis 16 of the screws, with the angle being preferable in the range of about 30 degrees to 60 degrees.

The lateral defection and twisting of the holding strap out from under the head is assisted by providing the beam member 26 and its beam segment 40 as a continuous segment along the length of the holding strap which requires movement in effect laterally as an integral unit.

Screwstrips have been described with reference to preferred embodiments illustrating as, for example, best shown in FIG. 4, a screwstrip in which the heads of the screw are disposed to be at a first constant radius $R_1$ from a point 122 and the tips of the screws are shown to be disposed at a second constant radius $R_2$. This is not necessary. A curved screwstrip need not be curved uniformly or constantly and a curved screwstrip includes any screwstrip in which the heads of the screws are disposed in a non-linear or curved configuration and the tips of the screws are also disposed at a non-linear or curved configuration with, preferably for each screw, an arc representing the location of the heads of the screws is of a lesser relative radius than the arc representing the tips of the screws. As well, screwstrips manufactured in accordance with this invention includes screwstrips which may be curved over merely a portion of their length.

In accordance with the preferred embodiments of the present invention, the axes of all the fasteners preferably lie in a common plane which plane is preferably flat. This is preferred, however, the axes of the fasteners could lie in a common plane which need not be flat but could be curved as, for example, such that the screwstrip may curve as to coil laterally about itself or adopt a slightly twisted configuration.

The screwstrip 10 shown in FIGS. 5 and 6 has been shown with the holding strap 14 having the profile of the outboardmost surface 66 of the beam member 26 vary in distance from the common plane 17 with this distance being greatest at cross-sections through each screw and least at cross-sections intermediate two screws, however, this is not necessary. The distance of the outboardmost surface 66 from the common plane varies in a generally sinusoidal curving manner between screws along the length of the holding strip. Despite the sinusoidal variances of the relative location of the outboardmost surface 66, this surface preferably defines a profile as seen in cross-sectional view normal the common plane which is substantially the same in any cross-section normal the common plane at any point along the entire length of the beam member 26. As well, despite the sinusoidal variances of the relative location of the outboardmost surface 66, the beam member of FIGS. 5 and 6 has an outboardmost beam segment 40 which extends towards the common plane from outboardmost surface 66 and has a cross-section of substantially the same size and shape in any cross-section normal the common plane at any point along the entire length of the holding strip.

The screwstrip may, as shown in FIG. 1, have an arrowhead shaped forwardmost portion 76 of a guide section 74 at a front end 60 of the holding strip 12 and a preferred, bifurcated, double-fin shaped rearwardmost portion 78 of a terminal section 80 at a rear end 62 of the holding strip 12.

The arrow shaped forwardmost portion 76 of the guide section 74 serves to assist in guiding the screwstrip through a nose portion of the autofeed screwdriving tool, such as shown in FIG. 4. A bifurcated, double-fin shaped rearwardmost portion 78 of terminal section 80 serves to resist guiding of the screwstrip through the nose portion of the autofeed screwdriving tool should a user attempt to insert the screwstrip incorrectly, that is, with the rear end 62 inserted first.

The shape of the guide section 74 visually identifies to a user that it is a lead end to be inserted first. The shape of the terminal section 80 visually indicates to a user that it is not a lead end to be inserted. The combination of the shape of the guide section 74 and the shape of the terminal section 80 visually identifies to a user, particularly in comparison of the guide section 74 with the terminal section 80 that the guide section 74 is to be inserted first into the tool.

In all the embodiments, the beam member 26 preferably carries on the lowermost portion 42 a lowermost strip supporting surface 43 disposed at a constant height measured parallel the axis of a screw from the head of each fastener.

The preferred provision of the beam member 26 to be of substantially uniform cross-section along the length of the screwstrip or, at least between screws, is advantageous such that the beam member provides substantially uniform strength along its length. With the beam member of the present invention, the difficulty of having the holding strap totally sever at its weakest location where a screw is received is reduced. With the outboardmost beam segment 40 being of constant shape and size throughout its length, the beam member 26 has relatively constant strength throughout its length and is less prone to deflect or break at any one point. Rather, the beam member 26 is adapted to transfer and bear vertical loading along its length.

Providing the uppermost portion 41 of the beam member to be of a lesser width than the reinforcing portion 44 assists the beam member 26 to deflect out of the way of the head of a screw being driven and particularly to assist in twisting of the beam member about its longitudinal axis. Thus, as contrasted with a beam of more rectangular upper cross-section as, for example, shown in FIG. 9, the provision of the lesser width uppermost portion 41 assists in imitation of twisting of the beam and lateral deflection out from under the head of a screw being driven. The provision of a lowermost portion 42 also of reduced width further assists the beam in being able to twist and deflect laterally. With the beam member having an ability to twist and deflect, it is less likely the beam member will tear and it is less likely the beam member will collapse under axially applied forces which would result in jamming in a power driver.

Provision of the reinforcing portion 44 of the beam of greater width than the uppermost portion 41 is advantageous to prevent tearing and/or collapse of the beam when a screw is being driven from the screwstrip. To the extent that in use, the uppermost portion 41 may have a tendency to be torn as at the location of a screw being driven, having the reinforcing portion 44 of increased width and, particularly with the width increasing abruptly as a step or shoulder as shown in FIGS. 5 and 6, is particularly advantageous to stop any tear which might be occurring from extending from the uppermost portion 41 down into or through the reinforcing portion 44.

Similarly, to the extent that in use, the lowermost portion 42 may have a tendency to be torn as at the location of a screw being driven, having the reinforcing portion of increased width and particularly with the width increasing abruptly as a step or shoulder is advantageous to stop any tear which might be occurring from extending from the lowermost portion 42 up into or through the reinforcing portion 44.

The enlarged reinforcing portion 44, particularly when having a substantial axial extent, assists in providing lateral stability to the screwstrip. By the combination of a beam member of substantially constant cross-section outboard of the shanks of the screws and with a reinforcing portion 44 of greater width than an uppermost portion 41, a screwstrip is provided which can twist and deflect to have increased resistance to severing and to have increased resistance to axially collapsing yet which provides sufficient strength to support the screwstrip holding screws fixed as is necessary for feeding of screws in power driver apparatus.

Preferably, the reinforcing portion 44 has a height measured parallel the axis of a screw which is greater than the height of either of the uppermost portion 41 or the lowermost portion 42 measured parallel the axis of the screws. The beam segment 40 preferably has a height greater than its width. Preferably, the beam member 26 and its beam segment 40 each have a height at least about twice their respective width.

Preferably, the height of the reinforcing portion 44 is about one-half the height of the beam member 26 or its beam segment 40. Preferably, the height of the uppermost portion 41 is greater than the height of the lowermost portion 42.

The screwstrip of the present invention is configured as a screwstrip of discrete length and is particularly adapted to be self-supporting in the sense that if the beam member 26 of the screwstrip is held at one end in a cantilevered fashion with the common plane vertical then the beam member has an appropriate size and configuration that having regard to the size and weight of the fasteners being held that the beam member supports the entire length without any undue or preferably any substantial vertical deflection. Of course, in selecting the size and configuration of the beam member, regard must be had to the nature of the plastic material or materials used for the beam member, typical temperature conditions for use and acceptable deflection having regard to power drivers to be used and intended usage. Many power drivers provide for the first two or three screws in a strewstrip to be supported in a guideway to the power driver. With many known power drivers, it has been found that at room temperatures for typical wood or drywall screws, with a 12 inch strip with ⅜ inch centered screws and supporting the strip with its common plane vertical cantilevered by holding horizontal merely three screws at one end of the strip a vertical deflection downward of the other end of the strip by up to 1.5 inches, more preferably 1 inch or less is acceptable.

As the weight of the screws to be supported in cantilevered fashion will reduce as successive screws are driven, one preferred configuration is with a compound curve, the radius of curvature smallest proximate the leading end 60 of a screwstrip and increasing towards the terminal end 62. As with the curved screwstrip shown in FIG. 3, with a compound curve the heads of the screws would lie in a first curve in the central plane and the tips would lie in a corresponding second curve of greater radii. Preferably, having regard to the size and weight of the fasteners, the beam member is sized such that the beam member, if held in a cantilevered fashion by one or more screws at one end as in a driver attachment as shown, provides sufficient strength to support the entire remaining length of the beam member with the fasteners disposed therein when the common plane is vertical without substantial deflection of the beam member, preferably without deflection beyond that which would unbend the curve to be straight, that is, to place the heads of the screws in a straight line in the common plane.

In FIG. 5, a dashed and dotted line 73 differentiates what may be characterized as a reinforcing rib 75 from the remainder of the holding strip. The remainder of the holding strip may be characterized as a web which extends axially relative the screws and between the screws. The web is elongated in height measured parallel the axis of the screws as contrasted with its width or width measured normal the common plane. The web carries sleeves formed by the straps and partially outboard into the web to receive the screws and lands joining the sleeves, which lands may have a varying width between sleeves. The reinforcing rib 75 is also elongated in height as contrasted with its width. The height of the rib 75 is less than the height of the web. The rib is disposed on the outboard side of the web with the rib 75 having relatively constant cross-sectional shape and size normal the common plane throughout its length across the outboard side of the web and both the sleeves and the lands. The rib 75 serves to reinforce and strengthen the web by providing increased width to the holding strip over the center of the web. While the rib 75 reinforces the web over its center, the web retains a resiliency and flexibility over its uppermost portion and lowermost portion which extends axially beyond the rib.

The web preferably comprises principally the outboard portion other than the rib 75 with any outboard portion representing a smaller proportion of the web than the outboard portion. Preferably, the rib comprises in the range of about 25% to 50% of the cross-sectional area of the outboard portion, more preferably, about one-third the cross-sectional area of the outboard portion.

The rib 75 preferably has a height of about one-half of the height of the web.

FIG. 3 illustrates the holding strip 12 without showing specific details as to the configuration or cross-sectional shape of the holding strip. A preferred configuration and cross-sectional shape for the holding strap is as disclosed in FIGS. 5 to 10, however, this is not necessary and the curved screwstrip of FIG. 3, in accordance with the present invention, may have many other configurations and cross-sectional shapes including those of previously known screwstrips and, particularly, those in which the holding strap 12 extends, as a web, axially relative the screws and between screws. The holding strap is preferably sufficiently self-supporting to maintain the screwstrip in a configuration that with the driver attachment vertical and the screwstrip extending sideways, the screwstrip does not droop downward below the tip of the screw being driven.

Preferred configurations for the holding strips are configurations in which the strip has spaced sleeves with one screw received in each sleeve with the head of the screw extending from one rear end of the sleeve and the tip of the screw extending from the other forward end of the sleeve, with the sleeve threadably engaging the threads on the shank of the screw, and with each sleeve having a reduced strength portion such that a screw on being threaded tip first into a workpiece is automatically separated from its sleeve while maintaining the length of the strap substantially intact and while guiding the fastener by threaded engagement of the fastener in its respective sleeve. It is not, however, necessary that the strap remain intact and straps holding fasteners in which the holding strap is severed on removal of a fastener can also be advantageously provided to have a curved configuration as in FIG. 3 in accordance with the invention.

While the curved screwstrip 10 is shown in FIGS. 1 to 10 as carrying threaded screws, it is to be appreciated that the fasteners need not be threaded fasteners and could comprise other fasteners such as nails, rivets, pins and the like.

As may be seen having regard to FIG. 6, the beam member includes an outboardmost beam segment 40 which extends inwardly from the profile of outboardmost surface 66 to plane 36. The beam member 26 is preferably extruded from one nozzle as a unitary member which is disposed on the outboard side of the shank 22 of each screw. The straps 32 are also preferably extruded from two other nozzles as thin elongate members which pass over each screw on the inboard side of the shank 22 and which become secured to the inboard surface 67 of the beam member 26 as two elongate rib-like members integral with the beam member 26.

As may also be seen having regard to FIGS. 4, 5 and 6, another segment 38 of the beam member is outboard of plane 34.

The holding strap is preferably made of plastic but could be made of any other type of extrudable material which has a tendency for a greater mass portion to shrink after forming greater than a lesser mass portion.

It is preferred that the curved screwstrip 10, shown in FIG. 4, have all the screws lie in a common plane which is flat. The common plane need not be flat and could, for example, be linear in direction parallel the screws, and curve when seen in a cross-section normal the screws. The common plane may be curved as, for example, with the common plane being part of a surface of a cone or cylinder member.

The embodiments shown have two straps 32. This is not necessary. Only a single strap 32 need be provided. The straps 32 as shown are but a preferred form of a fragile strap member which serves a purpose of securing a screw to the beam member 26 for release of the screw as described with reference to FIG. 7. The strap member need not be continuous and could be split or comprise a sleeve or split sleeve as in the manner of that described in Canadian Patent 1,040,600 to Keusch et al, issued Oct. 17, 1978. The strap member is merely a portion of the holding strap which retains the screw with less resistance to release of the screw than the remainder of the holding strip.

The complete screwstrip 10 of FIG. 1 is shown as comprising 12 screws. Screwstrips may be of different lengths as may be convenient. Preferably, screwstrips may be in the range of about 6 inches to 20 inches in length, more preferably about 12 inches.

The embodiments shown show a typical wood screw as but an illustrative threaded fastener. Many other threaded fasteners may be utilized including fasteners with or without washers and fasteners for driving with sockets and other tools.

While the invention has been described with reference to preferred embodiments, many modifications and variations will now occur to persons skilled in the art. For a definition of the invention, reference is made to the following claims.

The invention claimed is:

1. A curved screwstrip comprising in combination a plastic holding strap and a plurality of threaded fasteners;
   each fastener disposed about an axis and having a head at an upper end, a tip extending from the other lower end and a shank extending from below the head to the tip about the axis, threads about the shank, the holding strap holding the fasteners in a row in spaced side-by-side relation with the axis of the fasteners in a common plane;

at least a portion of the holding strap holding the fasteners in a generally curved configuration wherein the heads of the screws lie on a first curve in the common plane and the tips of the screws lie on a second curve in the common plane, wherein at each fastener in the portion a radius of curvature of the first curve is less than a radius of curvature of the second curve, the holding strap comprises an elongate beam member which extends axially relative the fasteners and longitudinally between fasteners, the beam having a height measured parallel the axis of the fasteners between an upper most surface of the beam and a lowermost surface of the beam, a middle of the beam defined as halfway between the uppermost surface and the lowermost surface with a top portion above the middle and a bottom portion below the middle, the beam formed of plastic material of substantially constant density, the top portion of the beam having a top mass, the bottom portion of the beam having a bottom mass, the top mass being greater than the bottom mass.

2. A screwstrip as claimed in claim 1 wherein the sum of the top mass and the bottom mass equals a total mass of the beam, the top mass comprising 55% or greater of the total mass.

3. A screwstrip as claimed in claim 2 wherein the top mass comprising between 60% and 80% of the total mass.

4. A screwstrip as claimed in claim 1 wherein the elongate beam having a cross-sectional profile which is substantially constant between adjacent screws.

5. A screwstrip as claimed in claim 1 wherein the holding strap comprising an elongate beam member on one, outboard side of the common plane and with, for each fastener, at least one fragile strap member bridging the beam member across the shank of its respective fastener and passing on the other inboard side of the common plane to retain the fastener on the beam member.

6. A screwstrip as claimed in claim 5 wherein the beam member including a lowermost portion closest the tip of the fastener and an enlarged reinforcing portion closer to the head than the lowermost portion;

in any cross-section normal the common plane the reinforcing portion having a width normal the common plane greater than a width of the lowermost portion normal the common plane such that an outboardmost surface of the beam member on the reinforcing portion extends farther outboard from the common plane than an outboardmost surface of the beam member on the lowermost portion.

7. A screwstrip as claimed in claim 6 wherein the beam member further includes an uppermost portion closer to the head than the reinforcing portion, in any cross-section normal the common plane the reinforcing portion having a width normal the common plane greater than a width of the uppermost portion normal the common plane such that the outboardmost surface of the beam member on the reinforcing portion extends farther outboard from the common plane than an outboardmost surface of the beam member on the uppermost portion.

8. A screwstrip as claimed in claim 7 wherein the reinforcing portion having a height measured parallel the axis of the fasteners which is greater than a height of either of the uppermost portion or the lowermost portion measured parallel the axis of the fasteners.

9. A screwstrip as claimed in claim 8 wherein the beam member has a height measured parallel the axis of the fasteners greater than its width measured normal the common plane.

10. A screwstrip as claimed in claim 9 wherein the height of the beam member is at least about twice its width.

11. A screwstrip as claimed in claim 10 wherein the height of the reinforcing portion is about one half of the height of the beam segment.

12. A screwstrip as claimed in claim 11 wherein the height of the uppermost portion is less than the height of the lowermost portion.

13. A screwstrip as claimed in claim 7 wherein the uppermost portion has an inboard camming surface facing the common plane, the camming surface angled to extend upwardly and away from the shank of the fastener for engagement with an undersurface of the head of the fastener to assist in deflecting the fastener relative the holding strip away from the beam member in a direction perpendicular the common plane on the fastener being threaded axially downwardly relative the beam member.

14. A screwstrip as claimed in claim 13 wherein the camming surfaces comprise bevelled uppermost inboard top surfaces of the uppermost portion extending continuously the entire length of the beam member.

15. A screwstrip as claimed in claim 1 wherein the common plane is a flat plane.

16. A screwstrip as claimed in claim 7 wherein two fragile strap members are provided for each screw comprising an upper strap member proximate the juncture between the uppermost portion and the reinforcing portion and a lower strap member proximate the juncture between the reinforcing portion and the lowermost portion.

17. A screwstrip as claimed in claim 1 wherein the heads of the fasteners are disposed a constant distance from a center point in said common plane with the axis of each fastener extending through the center point.

18. A screwstrip as claimed in claim 1 wherein the fasteners comprise threaded fasteners with threads about the shank, the beam member carrying spaced sleeves with one of the fasteners received in each sleeve, each fastener received in each sleeve spaced a uniform distance from adjacent fasteners with the fastener's head extending from one rear end of the sleeve and the fastener's tip extending from the other forward end of the sleeve, the sleeve threadably engaging the threads on the shank, the sleeve having a reduced strength portion such that a fastener on being threaded tip first into a workpiece is automatically separated from its sleeve while maintaining the length of the strip substantially intact and while guiding the fastener by threaded engagement of the fastener in its respective sleeve.

19. A screwstrip as claimed in claim 1 wherein the beam member comprises an elongate member of discrete length wherein, having regard to the size and weight of the fasteners, the beam member is sized such that the beam member, if held in a cantilevered fashion at one end, provides sufficient strength to support the entire length of the beam member with the fastener disposed therein when the common plane is vertical without deflection of the beam member sufficiently beyond deflection necessary to place the heads of the fasteners in a straight line in the common plane.

20. A screwstrip as claimed in claim 1 wherein an outboardmost surface of the beam member having substantially the same profile in any cross-section normal the common plane throughout the length of the beam member.

21. A screwstrip as claimed in claim 20 wherein in any cross-section normal the common plane the beam member having an outboardmost beam segment extending from said profile away from the common plane, which beam segment is of substantially identical shape and size throughout the length of the beam member.

22. A screwstrip as claimed in claim 21 wherein the identical shape and size of the beam segment throughout the length of the beam member is the same shape and size as a cross-section through the beam member normal the common plane through an axis of a fastener outboard of the shank.

23. A screwstrip as claimed in claim 1 wherein the beam member throughout the length of the beam member outboard of a plane parallel the common plane and passing immediately outboard of each of the fastener having a cross-section normal the common plane of substantially constant size and shape.

24. A screwstrip as claimed in claim 1 wherein the strap is formed by extrusion of plastic material onto shanks of the screws and between adjacent screws.

25. A curved screwstrip comprising in combination a plastic holding strap and a plurality of threaded fasteners;
   each fastener disposed about an axis and having a head at an upper end, a tip extending from the other lower end and a shank extending from below the head to the tip about the axis, threads about the shank,
   the holding strap holding the fasteners in a row in spaced side-by-side relation with the axis of the fasteners in a common plane;
   at least a portion of the holding strap holding the fasteners in a generally curved configuration wherein the heads of the screws lie on a first curve in the common plane and the tips of the screws lie on a second curve in the common plane, wherein at each fastener in the portion a radius of curvature of the first curve is less than a radius of curvature of the second curve,
   the holding strap comprises an elongate beam member which extends axially relative the fasteners and longitudinally between fasteners,
   the beam having a height measured parallel the axis of the fasteners between an upper most portion of the beam and a lowermost portion of the beam,
   a middle of the beam defined as halfway between the uppermost portion and the lowermost portion with a top portion above the middle and a bottom portion below the middle,
   the beam having a cross-sectional profile normal the common plane with a profile area,
   in any cross section normal the common plane, a larger proportion of the profile area being in the top portion of the beam than in bottom portion.

26. A method of manufacture of a curved screwstrip,
   the curved screwstrip comprising in combination, a holding strip and a plurality of fasteners,
   each fastener disposed about an axis and having a head and an upper end, a tip extending from the other end and a shank extending from below the head to the tip about the axis,
   the holding strap holding the fasteners in a row spaced side-by-side relation with the axis of the fasteners in a common plane,
   the holding strap comprises an elongate beam member which extends axially relative the fasteners and longitudinally between fasteners,
   at least a portion of the holding strap holding the fasteners in a generally curved configuration wherein the heads of the fasteners lie on a first curve in the common plane and the tips of the fasteners lie in a corresponding second curve in the common plane of greater radii:
   the method comprising:
   maintaining a plurality of screws in a generally straight row in spaced side-by-side relation with the axes of the fasteners generally parallel and in a common plane,
   extruding plastic to form the holding strap from an extrusion die onto the shanks of the screws in the straight row, wherein the plastic as extruded is in an extrudable, molten state at an elevated first temperature,
   forming the holding strap as a straight elongate beam member which extends axially relative the fasteners and longitudinally between fasteners to provide a straight screwstrip in which:
   i) the beam having a height measured parallel the axis of the fasteners between an upper most surface of the beam and a lowermost surface of the beam,
   iii) a middle of the beam defined as halfway between the uppermost surface and the lowermost surface with a top portion above the middle and a bottom portion below the middle,
   iii) the top portion of the beam having a top mass,
   iv) the bottom portion of the beam having a bottom mass, and
   vi) the top mass being greater than the bottom mass, and cooling the straight screwstrip whereby with cooling the differential in shrinking of top portion of the beam compared to the bottom portion of the beam results in the holding strap assuming a curved condition.

27. A method as claimed in claim 26 including cutting the holding strap between two adjacent screws while the screwstrip is straight to form discrete uniform length segments.

28. A method as claimed in claim 26 in which the straight screwstrip is not constrained deforming to a desired curved configuration cooled.

29. A method as claimed in claim 27 including moving the screws while held in the straight row past the fixed extrusion die.

* * * * *